United States Patent [19]
Steffens, Jr. et al.

[11] Patent Number: 5,658,010
[45] Date of Patent: Aug. 19, 1997

[54] AIR BAG INFLATOR

[75] Inventors: Charles E. Steffens, Jr., Washington; Thomas H. Vos, Oxford, both of Mich.

[73] Assignee: TRW Vehicle Safety Systems Inc., Lyndhurst, Ohio

[21] Appl. No.: 533,397

[22] Filed: Sep. 25, 1995

[51] Int. Cl.⁶ .................................................. B60R 21/16
[52] U.S. Cl. .................................... 280/731; 280/741
[58] Field of Search ............................ 280/736, 741, 280/742, 731, 728.2; 102/530, 531

[56] References Cited

U.S. PATENT DOCUMENTS

| | | | |
|---|---|---|---|
| 3,724,870 | 4/1973 | Kurokawa et al. | 280/741 |
| 3,768,824 | 10/1973 | Kloppe et al. | 280/731 |
| 3,773,352 | 11/1973 | Radke . | |
| 3,895,823 | 7/1975 | Stephenson | 280/731 |
| 4,136,894 | 1/1979 | Ono et al. | 280/741 |
| 4,919,897 | 4/1990 | Bender et al. | 280/736 |
| 5,286,054 | 2/1994 | Cuevas | 280/741 |
| 5,364,254 | 11/1994 | Esterberg | 280/741 |
| 5,387,009 | 2/1995 | Lauritzen et al. | 280/741 |

FOREIGN PATENT DOCUMENTS 2218698  11/1989  United Kingdom ............... 280/732

*Primary Examiner*—Paul N. Dickson
*Attorney, Agent, or Firm*—Tarolli, Sundheim, Covell, Tummino & Szabo

[57] ABSTRACT

An air bag module (12) is mounted for rotation with a vehicle steering wheel (14) which has a steering axis (90). The module (12) includes an inflator (10) having separately actuatable first and second stages (40, 40a). The stages (40, 40a) include, respectively, first and second chambers (60, 60a) and an inflation fluid source (120, 120a) in each chamber for providing inflation fluid to inflate an air bag (16). An axis (58) of the first chamber (60) extends parallel to and is spaced apart from an axis (58a) of the second chamber (60a). The axes (58, 58a) of the chambers (60, 60a) extend transverse to the steering axis (90) on opposite sides of the steering axis.

20 Claims, 2 Drawing Sheets

5,658,010

AIR BAG INFLATOR

BACKGROUND OF THE INVENTION

1. Technical Field

The present invention relates to a vehicle safety apparatus including an inflatable vehicle occupant restraint and, particularly, relates to an air bag inflator for providing inflation fluid for inflating an air bag to help protect a vehicle occupant.

2. Description of the Prior Art

It is known to help protect a vehicle occupant by an air bag that is inflated in the event of sudden vehicle deceleration, such as occurs in a vehicle collision. The air bag helps to protect the vehicle occupant by constraining movement of the vehicle occupant during the collision. The air bag is inflated by inflation fluid provided by an air bag inflator. An air bag for helping to protect a driver of a vehicle is typically mounted, together with its associated inflator, on the steering wheel of the vehicle.

SUMMARY OF THE INVENTION

The present invention is a vehicle occupant safety apparatus for mounting for rotation with a vehicle steering wheel which is rotatable about a steering axis. The apparatus includes an inflatable vehicle occupant restraint which is inflatable into a position to help protect a driver of the vehicle. The apparatus also includes an inflator for supplying inflation fluid to the inflatable restraint to inflate the inflatable restraint. The inflator includes a housing defining first and second chambers. An inflation fluid source is in each of the chambers. Each of the first and second chambers has an axis. The axis of the first chamber extends parallel to and is spaced apart from the axis of the second chamber. The axes of the chambers extend transverse to the steering axis.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF PREFERRED EMBODIMENTS

Figure 1:
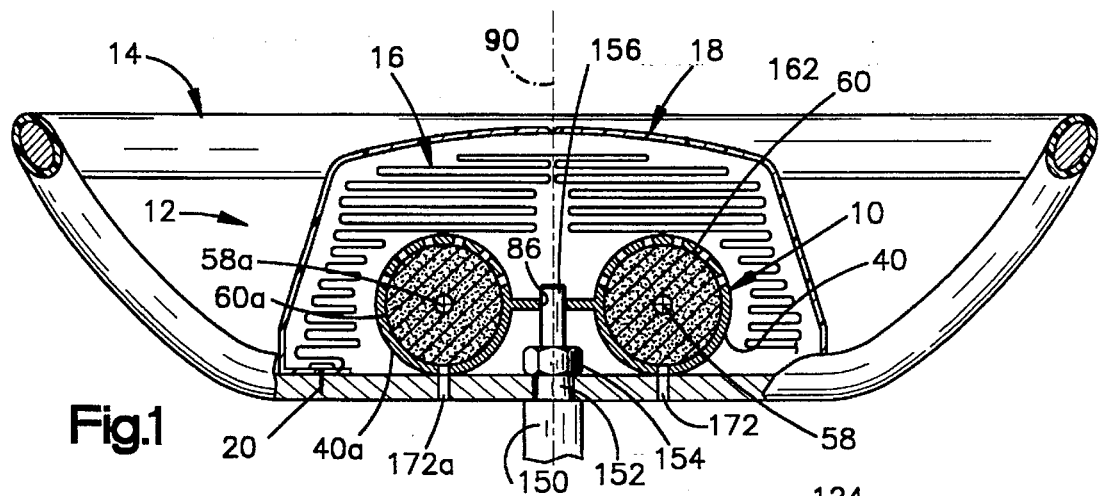
FIG. 1 is a schematic sectional view of a vehicle steering wheel assembly on which an air bag module is mounted.

The present invention relates to an apparatus for inflating an inflatable vehicle occupant restraint and, particularly, to an inflator for inflating an air bag to help protect the driver of a vehicle in the event the vehicle encounters sudden vehicle deceleration requiring air bag inflation. The present invention is applicable to various air bag inflator constructions. As representative of the present invention, FIG. 1 illustrates an inflator 10.

The inflator 10 forms a part of an air bag module illustrated schematically at 12 which is mounted for rotation with a vehicle steering wheel 14. The air bag module 12 also includes a particular type of inflatable vehicle occupant restraint 16, commonly known as an air bag, which is folded and stored with the inflator 10 inside a cover 18. The cover 18 and the air bag 16 are mounted with suitable known fastening means, indicated schematically at 20, for rotation with the vehicle steering wheel 14. The steering wheel 14 has a steering axis 90 about which the steering wheel is rotatable to effect steering of the vehicle.

Figure 3:
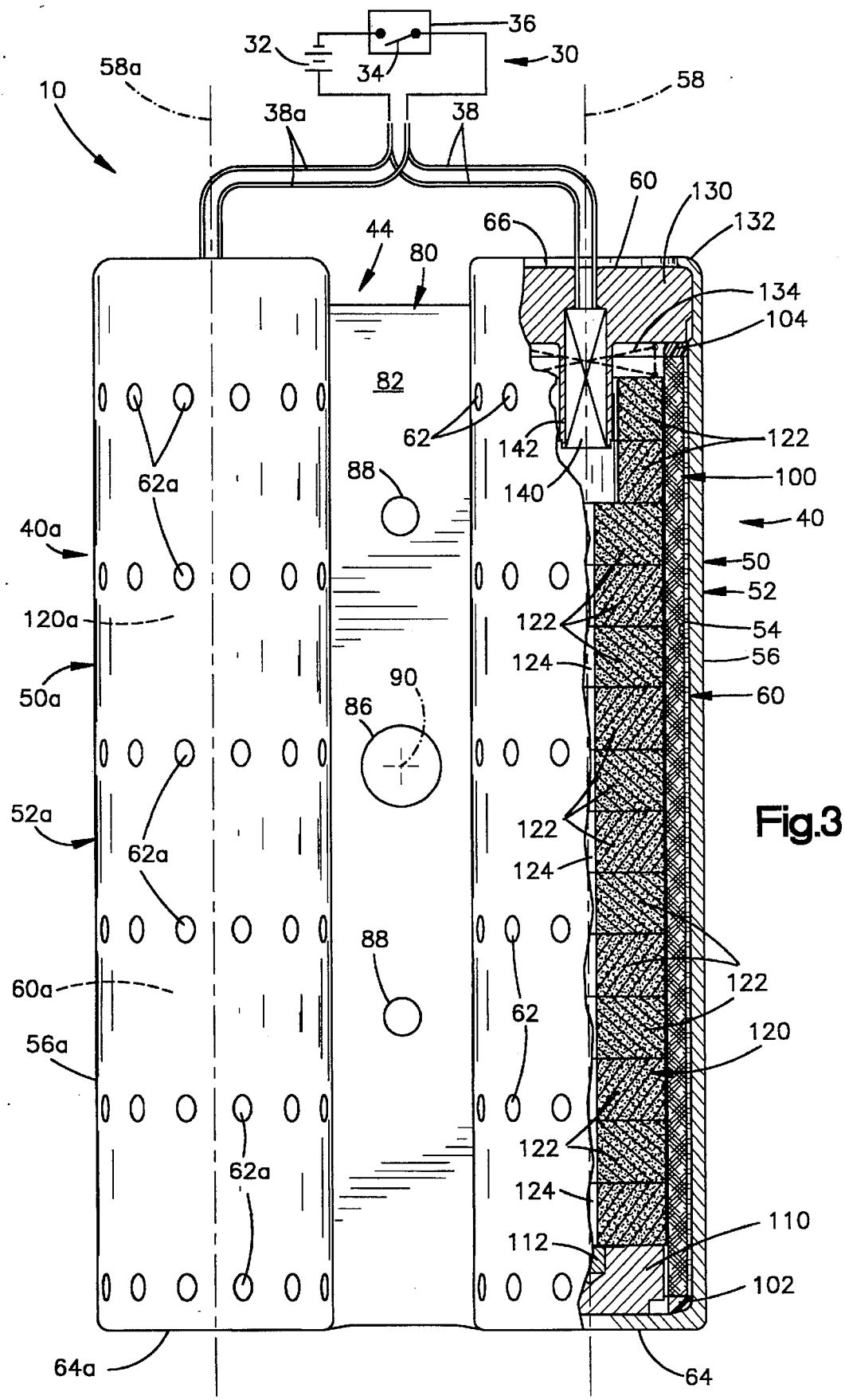
FIG. 3 is a plan view, partially in section, of the inflator of FIG. 1.

The vehicle includes electric circuitry shown schematically at 30 (FIG. 3) which includes a power source 32, such as the vehicle battery, and a normally open switch 34. The switch 34 is part of a deceleration sensor 36. The switch 34 closes upon the occurrence of a predetermined amount of vehicle deceleration indicative of a vehicle collision requiring air bag inflation. When the switch 34 closes, electric current passes through lead wires 38 to actuate the inflator 10.

Figure 2:
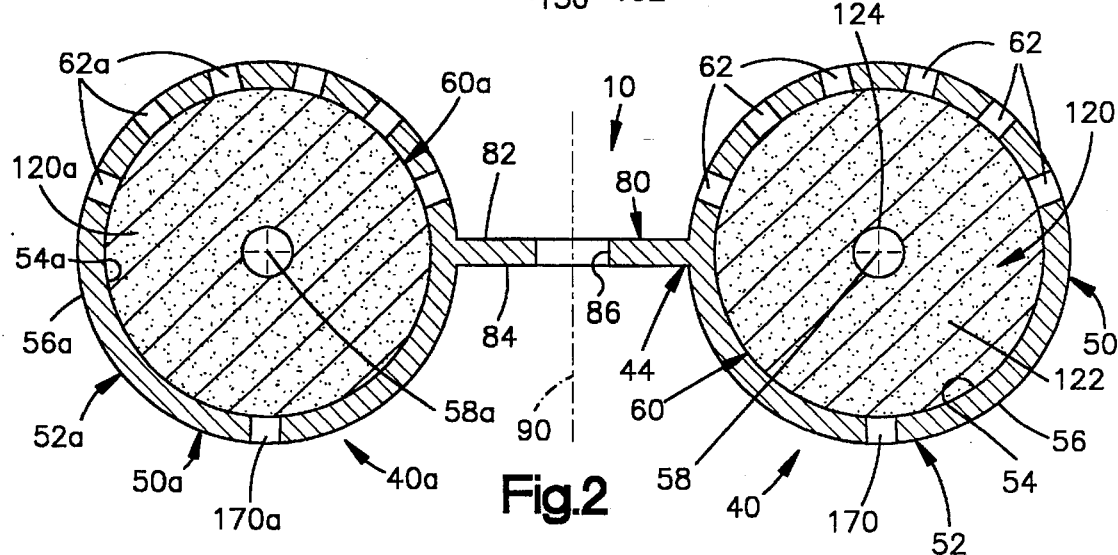
FIG. 2 is a sectional view of the inflator of FIG. 1.

The inflator 10 (FIGS. 1–3) includes separately actuatable first and second stages 40 and 40a, respectively. In the embodiment of the invention illustrated in FIGS. 1–3, the first and second stages 40 and 40a are identical to each other and so only the first stage is described herein in detail. Parts of the second stage 40a which are the same as the corresponding parts of the first stage 40 are given the same reference numeral with the suffix "a" added for clarity.

The inflator 10 (FIG. 2) includes a housing 44. The housing 44 includes spaced apart, tubular first and second portions 50 and 50a. The housing portions 50 and 50a are symmetrical about the steering axis 90. The first portion 50 of the housing 44 is associated with and forms a part of the first stage 40 of the inflator 10. The second portion 50a of the housing 44 is associated with and forms a part of the second stage 40a of the inflator 10. The housing 44 also includes a mounting portion 80. The first and second housing portions 50 and 50a and the mounting portion 80 of the housing 44 are formed as one piece, preferably by impact extrusion. The housing 44 is made from a single, homogeneous piece of material, preferably aluminum.

The first portion 50 (FIG. 3) of the housing 44 includes an axially extending, cylindrical side wall 52 which has cylindrical inner and outer surfaces 54 and 56 extending parallel to a longitudinal central axis 58 of the first stage 40 of the inflator 10. The inner surface 54 of the side wall 52 defines a cylindrical chamber 60 in the first portion 50 of the housing 44. A plurality of gas outlet openings 62 in the side wall 52 extend radially between the inner and outer surfaces 54 and 56 of the side wall. The gas outlet openings 62 establish fluid communication between the chamber 60 of the first stage 40 of the inflator 10 and the interior of the air bag 16 (FIG. 1). A radially extending end wall 64 (FIG. 3) of the first portion 50 of the housing 44 closes one end of the chamber 60. The end wall 64 is formed as one piece with the side wall 52. Alternatively, the end wall 64 could be formed as an end cap separate from the side wall 52, such as the end cap 130 described below. The side wall 52 at its end opposite the end wall 64 defines an opening 66 into the chamber 60.

The second stage 40a of the inflator 10 includes an axially extending, cylindrical side wall 52a which has a cylindrical outer surface 56a. The outer surface 56a of the side wall 52a extends parallel to a longitudinal central axis 58a of the second stage 40a of the inflator 10. The axis 58a of the second stage 40a extends parallel to, but is not coincident with, the axis 58 of the first stage 40 of the inflator. The axes 58 and 58a are spaced apart from each other and extend transverse to the steering axis 90. The inner surface 54a of the side wall 52a of the second portion 50a of the housing 44 defines a chamber 60a of the second stage 40a which is coaxial with the axis 58a and through which the axis 58a extends. A radially extending end wall 64a of the second portion 50a of the housing 44 closes one end of the chamber 60a. The end wall 64a is formed as one piece with the side wall 52a.

The mounting portion 80 of the housing 44 extends between the first and second portions 50 and 50a of the housing. The mounting portion 80 comprises a single layer of material and preferably lies in a plane which includes the longitudinal central axes 58 and 58a of the inflator 10. The mounting portion 80 has a planar configuration and includes parallel upper and lower side surfaces 82 and 84. A locator opening 86 in the mounting portion 80 is centered on the steering axis 90. A pair of threaded fastener openings 88 extend through the mounting portion 80 on opposite sides of the locator opening 86.

An elongate, annular filter 100 is disposed in the chamber 60 of the first stage 40 of the inflator 10, adjacent the inner surface 54 of the side wall 52 of the housing 44. An annular first filter seal 102 is disposed between the filter 100 and the housing end wall 64. An annular second filter seal 104 engages an axially outer end surface of the filter 100 adjacent the opening 66 of the chamber 60. A spacer 110 is disposed in the chamber 60 adjacent the end wall 64 and radially inward of the seal 102 and the filter 100.

An inflation fluid source comprising gas generating material 120 is disposed in the chamber 60 in the first stage 40 of the inflator 10. The gas generating material 120 includes a plurality of cylindrical grains 122 of any gas generating material such as a known sodium azide or organic composition. The grains 122 have central openings defining a central passageway 124 extending axially through the gas generating material 120.

The gas generating material 120 typically ignites and burns at a temperature of about 650° F. or higher. The inflator 10 may on occasion be subjected to abnormally high temperatures, for example, if the vehicle in which the inflator is mounted is involved in a fire. In such a situation, the gas generating material 120 might be at a high enough temperature to ignite. To avoid ignition of the gas generating material 120 when the ambient vehicle temperature is excessively high, the first stage 40 of the inflator 10 includes a body of auto ignition material 112 (FIG. 3) disposed in a recess in the spacer 110. The auto ignition material 112 is specifically designed to ignite at a lower temperature, typically about 350° F., than the temperature at which the gas generating material 120 ignites. Ignition of the auto ignition material 112 will result in ignition of the gas generating material 120.

An end cap 130 closes the opening 66 of the chamber 60 in the first stage 40 of the inflator 10. A curled end portion 132 of the cylindrical side wall 52, disposed axially outward of the end cap 130, secures the end cap in position. The end cap 130 engages the second filter seal 104. The end cap 130 also engages a spring 134 or the like which extends between the end cap and the outermost grain 122 of gas generating material 120 to inhibit movement of the grains of gas generating material relative to the housing 44.

An igniter 140 is secured in an inwardly projecting barrel portion 142 of the end cap 130. The igniter 140 is of a known construction suitable to ignite the grains 122 of gas generating material 120. The lead wires 38 extend outward from the igniter 140 through the end cap 130 and are connected to the vehicle electric circuitry 30, in a known manner, and receive an electric signal to actuate the igniter 140.

The inflator 10 (FIG. 1) is mounted with the vehicle steering wheel 14 on a steering shaft 150 of the vehicle. The steering shaft 150, as shown, is coaxial with the steering axis 90. A splined connection 152 and a nut 154 secure the steering wheel 14 for rotation with the steering shaft 150 about the steering axis 90.

An end portion 156 of the steering shaft 150 projects axially through the locator opening 86 in the mounting portion 80 of the housing 44 of the inflator 10. A pair of fasteners (not shown) are inserted through openings (not shown) in the vehicle steering wheel 14 and are screwed into the fastener openings 88 in the mounting portion 80 of the inflator 10 to secure the inflator for rotation with the vehicle steering wheel.

When the inflator 10 is thus assembled on the steering wheel 14, the electrical circuitry of the vehicle (FIG. 4) extends through the igniter 140 via the lead wires 38. The axes 58 and 58a of the chambers of the inflator 10 extend perpendicular to the steering axis 90 and are spaced apart on opposite sides of the steering axis. A pair of passages 170 and 170a (FIG. 2) in the housing portions 50 and 50a, respectively, align with passages 172 and 172a (FIG. 1) in the vehicle steering wheel 14. In the event of over-pressurization of the chambers 60 and 60a in the inflator 10, such as in the event of excessive temperature, a burst member (not shown) covering the passages 170 and 170a opens to relieve the pressure in the chambers.

When the vehicle in which the air bag module 10 is mounted experiences deceleration of a magnitude indicative of a collision for which air bag inflation is desired, the normally open switch 34 in the vehicle electric circuitry 30 closes and an electric current passes through the igniter 140. The igniter 140 is actuated and produces combustion products which ignite the gas generating material 120 within the chamber 60 in the first stage 40 of the inflator 10. The gas generating material 120, as it burns in the chamber 60, produces a large volume of inflation fluid in the form of gas under pressure. The gas flows radially outward through the filter 100 and through the gas outlet openings 62. The gas flows from the outlet opening 62 of the first stage 40 of the inflator 10 into the air bag 16.

The second stage 40a of the inflator 10 may be actuated simultaneously with the first stage 40. The second stage 40a, when actuated, produces a large volume of gas under pressure which flows through the gas outlet openings 62a into the air bag 16. The combined flow of gas from the first and second stages 40 and 40a of the inflator 10 inflates the air bag 16 to help protect the driver of the vehicle.

Figure 4:
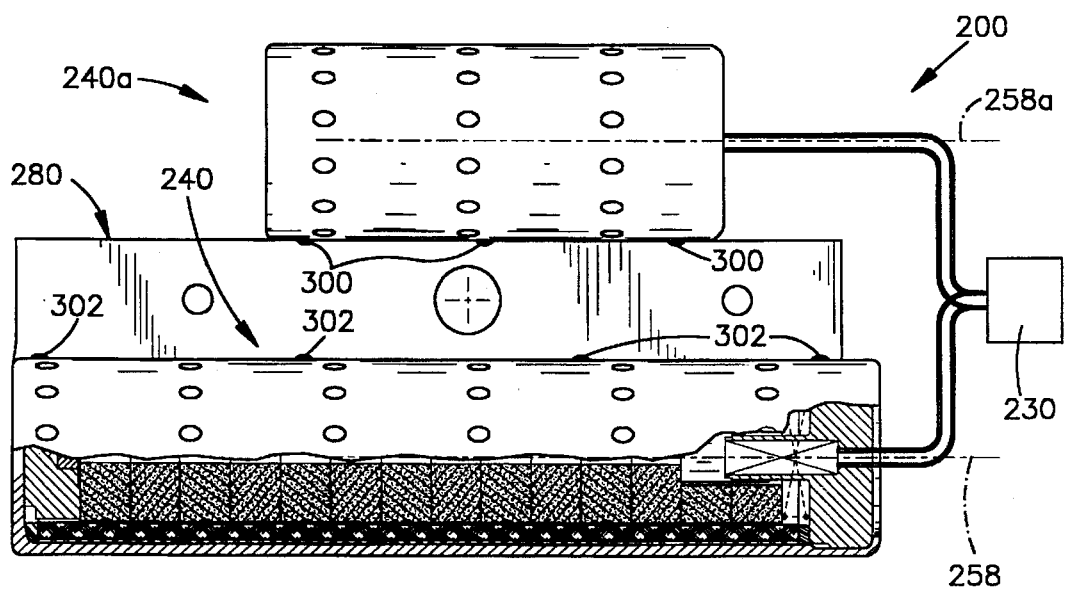
FIG. 4 is a view similar to FIG. 3 of an inflator constructed in accordance with a second embodiment of the present invention.

It should be understood that the two stages 40 and 40a of the inflator 10 can be actuated at different times, in a known manner. Further, an inflator constructed in accordance with the present invention can have separately actuatable stages which are of different sizes. For example, FIG. 4 illustrates an inflator 200 having a first stage 240 which is larger, i.e., longer, than a second stage 240a of the inflator. The housing of the inflator 200 is not made as one piece. The first stage 240 of the inflator 200 is spot welded as indicated schematically at 302 to a mounting portion 280 of the inflator. The second stage 240a of the inflator 200 is spot welded as indicated schematically at 300 to the mounting portion 280 of the inflator.

The first stage 240 of the inflator 200 contains more gas generating material than the second stage 240a. The larger amount of gas generating material in the first stage 240 of the inflator 200 produces a larger amount of inflation fluid, when ignited, than the gas generating material in the second stage 240a of the inflator. The stages 240 and 240a of the inflator 200, like the stages 40 and 40a of the inflator 10

(FIGS. 1–3), can be actuated at different times to control the pressure at given times in the air bag to tailor the inflation of the air bag 16.

From the above description of the invention, those skilled in the art will perceive improvements, changes and modifications in the invention. For example, a dual stage inflator constructed in accordance with the present invention could be mounted in a vehicle at a location other than the vehicle steering wheel. Such improvements, changes and modifications within the skill of the art are intended to be covered by the appended claims.

Having described the invention, we claim:

1. A vehicle occupant safety apparatus for mounting for rotation with a vehicle steering wheel having a steering axis, said apparatus comprising:

an inflatable vehicle occupant restraint which is inflatable into a position to help protect a driver of the vehicle;

means for mounting said inflatable restraint for rotation with the vehicle steering wheel;

an inflator for providing inflation fluid to said inflatable restraint to inflate said inflatable restraint; and means for mounting said inflator for rotation with the vehicle steering wheel;

said inflator comprising a housing defining first and second chambers and an inflation fluid source in each one of said chambers for providing inflation fluid to inflate said inflatable restraint;

each one of said first and second chambers having a respective non-radial linear axis, said axis of said first chamber extending parallel to and being spaced apart from said axis of said second chamber, said axis of said first chamber being axially coextensive with and being not collinear with said axis of said second chamber, said means for mounting comprising means for mounting said inflator for rotation with the vehicle steering wheel with said axes of said chambers extending transverse to the steering axis of the vehicle steering wheel.

2. An apparatus as set forth in claim 1 wherein said housing includes first and second housing portions which define said first and second chambers, respectively, and which provide each one of said chambers with a cylindrical configuration, said axes of said chambers comprising longitudinal central axes of said chambers.

3. An apparatus as set forth in claim 1 wherein each one of said inflation fluid sources comprises gas generating material in a respective chamber of said inflator for, upon actuation of said inflator, generating gas for inflating said inflatable restraint, said inflator further comprising first and second separately actuatable igniters for igniting said gas generating material in said first chamber simultaneously with or at a different time from said gas generating material in said second chamber.

4. An apparatus as set forth in claim 3 wherein said gas generating material comprises cylindrical grains of gas generating material which are ignitable to generate gas for inflating said inflatable restraint.

5. An apparatus as set forth in claim 1 wherein said means for mounting said inflator comprises a mounting portion of said housing, said housing including spaced apart first and second portions defining said first and second chambers, said mounting portion of said housing being formed as one piece with said first and second portions of said housing.

6. An apparatus as set forth in claim 5 wherein said mounting portion comprises a single layer of material and has a planar configuration including parallel first and second opposite major side surfaces extending between said first and second housing portions, said mounting portion having fastener openings for receiving fasteners extensible through said mounting portion in a direction parallel to the steering axis.

7. An apparatus as set forth in claim 1 wherein said housing includes spaced tubular wall portions defining said first and second chambers and a mounting portion extending between and interconnecting said tubular wall portions.

8. An apparatus as set forth in claim 7 wherein said tubular wall portions and said mounting portion are formed as one piece.

9. An apparatus as set forth in claim 7 wherein said tubular wall portions are formed separately from said mounting portion and are welded to said mounting portion.

10. An apparatus as set forth in claim 7 wherein said tubular wall portions defining said first and second chambers are cylindrical in configuration and said mounting portion is planar in configuration.

11. An apparatus as set forth in claim 7 wherein said tubular wall portions defining said first and second chambers are cylindrical including parallel cylindrical inner and outer surfaces extending parallel to said respective linear axes of said chambers and are symmetrical about the vehicle steering axis.

12. An apparatus as set forth in claim 1 wherein each one of said inflation fluid sources comprises gas generating material for, when ignited, supplying gas under pressure to inflate said inflatable restraint, said housing including a plurality of fluid outlet openings in said chambers for directing gas under pressure into said inflatable restraint to inflate said inflatable restraint upon ignition of said gas generating material.

13. An apparatus as set forth in claim 1 wherein said axes of said chambers are spaced apart on opposite sides of the steering axis and extend perpendicular to the steering axis, said housing including a mounting portion disposed intermediate the first and second chambers, the steering axis extending through said mounting portion of said housing.

14. A vehicle occupant safety apparatus for mounting for rotation with a vehicle steering wheel having a steering axis and for providing inflation fluid for inflating an inflatable vehicle occupant restraint into a position to help protect a driver of the vehicle, said apparatus comprising:

first and second separately actuatable stages;

said first stage comprising (i) a first tubular housing having parallel cylindrical outer and inner side surfaces defining a first chamber and (ii) a first source of inflation fluid for inflating said inflatable restraint, said first chamber having a linear longitudinal central axis extending parallel to said outer and inner side surfaces;

said second stage comprising (i) a second tubular housing having parallel cylindrical outer and inner side surfaces defining a second chamber and (ii) a second source of inflation fluid for inflating said inflatable restraint, said second chamber having a linear longitudinal central axis extending parallel to said outer and inner side surfaces;

said longitudinal central axis of said first chamber extending parallel to said longitudinal central axis of said second chamber; and means for mounting said inflator for rotation with the vehicle steering wheel with said central axes of said chambers extending transverse to the steering axis of the vehicle steering wheel.

15. An apparatus as set forth in claim 14 further comprising a mounting plate formed as one piece with said first and second tubular housings and extending between and interconnecting said first and second stages, said mounting plate comprising a single layer of material having fastener openings through which fasteners are extensible for mounting said inflator for rotation with said vehicle steering wheel.

16. An apparatus as set forth in claim 14 wherein said axis of said first chamber is spaced apart from said axis of said second chamber, the steering axis extending through a mounting portion of said inflator disposed intermediate the axes of said first and second stages.

17. An apparatus as set forth in claim 14 further comprising first lead wires for transmitting an electrical signal to said first stage for actuating said first stage and second lead wires for transmitting an electrical signal to said second stage for actuating said second stage of said inflator.

18. An apparatus as set forth in claim 14 wherein said central axes of said chambers are spaced apart on opposite sides of the steering axis.

19. An apparatus as set forth in claim 18 wherein said tubular housings defining said first and second chambers are cylindrical and are symmetrical about the vehicle steering axis.

20. An apparatus as set forth in claim 14 wherein each one of said first and second sources of inflation fluid comprises gas generating material for, when ignited, providing gas to inflate said inflatable restraint, said inflator further comprising first and second separately actuatable igniters for igniting said gas generating material in said first chamber simultaneously with or at a different time from said gas generating material in said second chamber.

\* \* \* \* \*